United States Patent

[11] 3,575,455

| | | |
|---|---|---|
| [72] | Inventor | Roy W. Bloch<br>Northbrook, Ill. |
| [21] | Appl. No. | 828,541 |
| [22] | Filed | May 28, 1969 |
| [45] | Patented | Apr. 20, 1971 |
| [73] | Assignee | Ekco Products, Inc.,<br>Cook County, Ill. |

[54] PAN CARRIER
3 Claims, 3 Drawing Figs.

[52] U.S. Cl. .................................................. 294/16,
224/45
[51] Int. Cl. ................................................... B65g 7/12
[50] Field of Search ....................................... 224/45.14,
45.6, 45.7, 45.15; 294/15, 16, 33, 92, 27, 27 (H),
32

[56] References Cited
UNITED STATES PATENTS

| | | | |
|---|---|---|---|
| 884,434 | 4/1908 | Wolgamott .................. | (224/45.6) |
| 3,262,728 | 7/1966 | Atterbury ..................... | 294/16 |
| 3,414,910 | 12/1968 | Provi et al .................... | 224/45.(14)X |

Primary Examiner—Albert J. Makay
Attorneys—Robert D. Teichert and Donald J. Koprowski ABSTRACT: A pan carrier has a pair of opposed pan-engaging members having horizontal flanges and a pair of gripping members which facilitate the handling of pans having peripheral flanges.

Patented April 20, 1971 3,575,455

Inventor
Roy W. Bloch
By
Attorney

PAN CARRIER

BACKGROUND OF THE INVENTION

This invention relates to carriers suitable for handling pans. More particularly, it relates to a carrier for retrieving and lifting pans having peripheral flanges from a rack and transporting them to other locations. The invention is especially suited for retrieving metallic foil steam table pans full of hot food from a shelf in an oven and transporting them to steam table well openings.

Cafeterias and other establishments that serve food generally have steam tables for keeping food warm that are provided with openings or wells in which pans of food are nested snugly. The food is usually prepared in a hot oven in the pan and the full pan is then transported to the steam table well where it is kept warm for serving.

In the handling of these relatively large pans or trays containing hot foods several factors are important. First, when shelves in the oven are spaced very closely together to utilize space most effectively, it becomes difficult to retrieve the pans due to the minimum clearances between adjacent shelves. Second, when the pans are constructed from a flexible material, such as metallic foil, it becomes difficult to lift and carry the pans unless they are supported along a substantial portion of their length. Lastly, the pans must be lifted and carried with utmost care to prevent spilling the contents and burning of the handler. Heretofore the method of handling these containers manually with insulated gloves, mittens or pads, or other methods, have proven inadequate to accomplish the above objectives.

Accordingly, an object of this invention is to provide a device which will facilitate the handling of steam table pans by providing a means for retrieving such pans from between closely spaced shelves and carrying them more safely and efficiently.

SUMMARY OF THE INVENTION

A carrier for handling pans having peripheral flanges comprises an elongated handle member, at least one rigid transverse member immovably secured to the handle member and a pair of opposed pan-engaging members immovably secured at the outer edges of the transverse member. Each pan engaging member has a vertical leg with a horizontal flange projecting inwardly at the bottom thereof. A gripping member is rigidly secured adjacent to the inside of each vertical leg.

By engaging the horizontal flange of the pan-engaging member beneath the peripheral flange of the pan, and inclining the carrier, the gripping members will frictionally engage the upper surface of the peripheral flange and enable it to be retrieved from between closely spaced shelves. Once retrieved, the horizontal flanges of the carrier may engage, along their full length, the peripheral flanges of the pan and the pan may easily and safely be lifted and carried.

DESCRIPTION OF THE PREFERRED EMBODIMENTS

Figure 1:
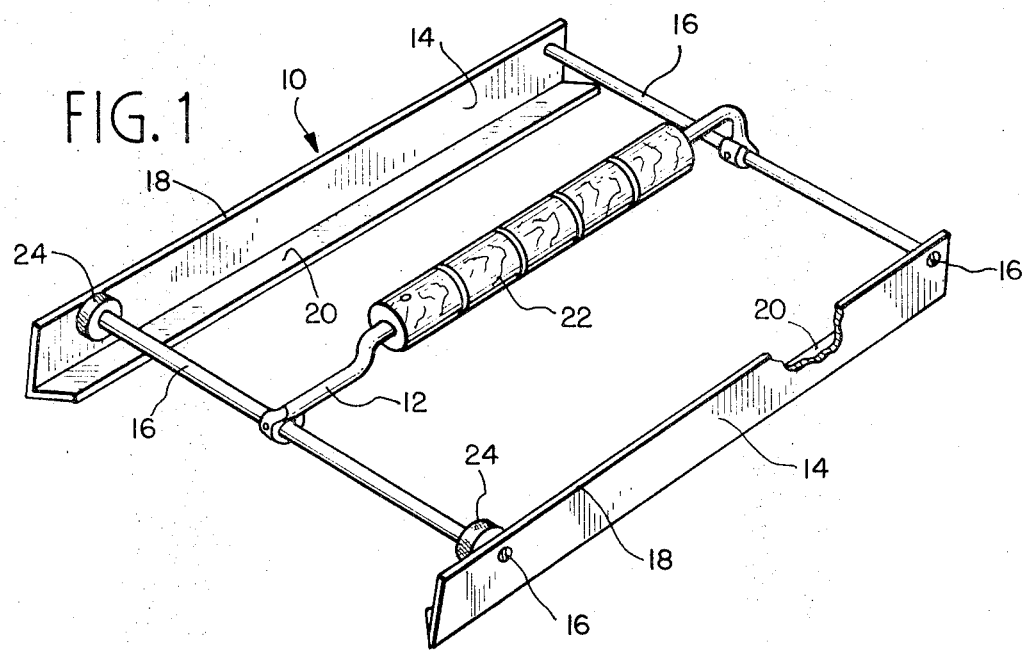
FIG. 1 is a perspective view of the preferred embodiment of the present invention.

As a preferred or exemplary embodiment of the present invention the drawings illustrate the carrier 10 which comprises an elongated handle member 12 and a pair of opposed pan-engaging members 14. At least one, and preferably two, transverse members 16 rigidly connect the handle member 12 with the pan-engaging members 14.

Each pan-engaging member 14 has a vertical leg 18 and an inwardly projecting horizontal flange 20. Enough clearance must be provided between the upper surface of the horizontal flanges 20 and the transverse members 16 and handle member 12 to accommodate container covers (not shown), or any mounded container contents. The handle member 12 includes a handle 22 constructed preferably of wood or other heat insulating material, suitable for grasping comfortably with the hand.

Figure 3:
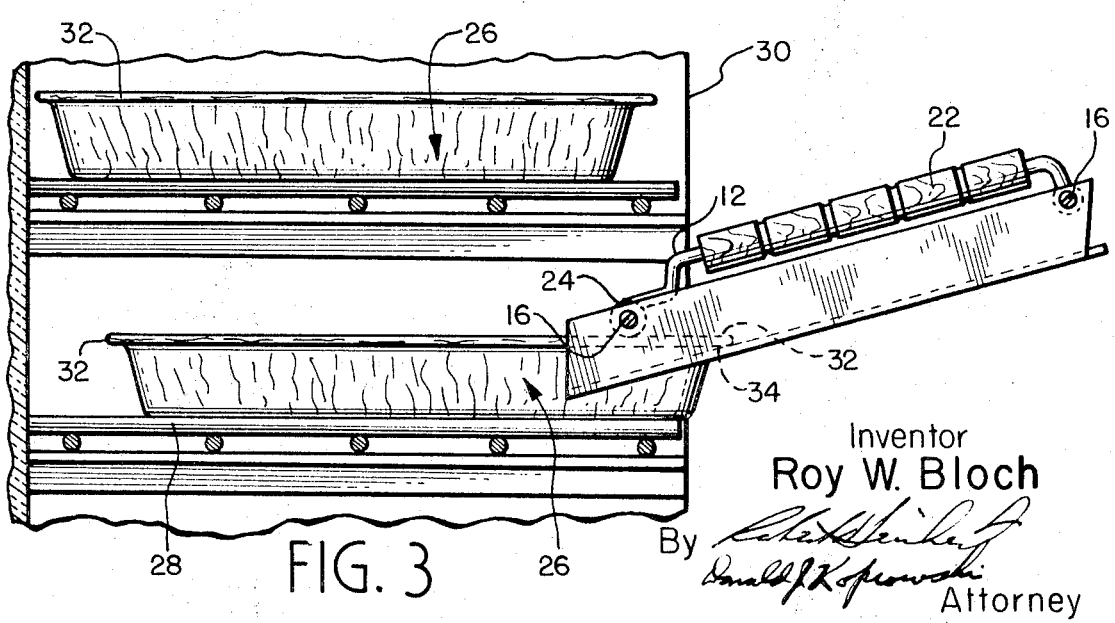
FIG. 3 is a side elevational view of the carrier in position for retrieving a pan from between closely spaced shelves of an oven.

A gripping member 24 is rigidly secured adjacent to the inside of each vertical leg 18. Each gripping member 24 is preferably substantially circular and has a knurled or otherwise roughened surface, suitable for frictionally bearing on the upper surface of a pan flange 32. The gripping members 24 should be located near the front edge of the vertical leg 18 of the pan-engaging member 14 as shown in FIGS. 1 and 3 of the drawings. It is not essential, however, that the gripping members 24 be located at the ends of the transverse member 16. For example, the transverse member 10 could be located nearer the center of the carrier 10 with the gripping members 24 remaining in the location shown in the drawings.

Figure 2:
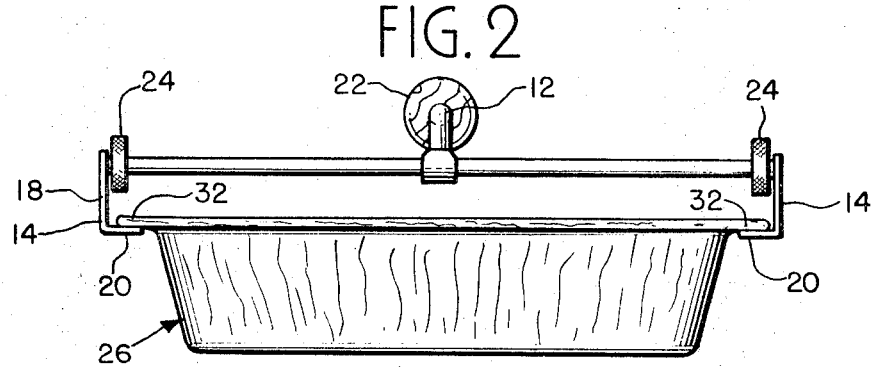
FIG. 2 is a front elevational view of the drawing of FIG. 1.

The use of the carrier 10 is shown in FIGS. 2 and 3. FIG. 3 illustrates a pan 26 on a shelf 28 in an oven 30 such as might be used to cook or heat the contents of the pan 26. To retrieve the pan from between the shelves 28, the carrier 10 approaches the pan 26 in a horizontal direction with the pan engaging members 14 positioned just below the flanges 32 of the pan 26. The carrier 10 is pushed into the oven 20 to a point where the handle or hand is restricted by the next-above closely spaced shelf. The carrier 10 is then inclined with its leading edge downward as shown in FIG. 3 until the gripping members 24 bear on the upper surface of the pan flange 32, and the upper surface of the horizontal flange of the pan engaging members 14 contact a point 34 near the rear edge of the pan flange 32. With the pan 26 held fast by the carrier 10 in this position, it can be partially retrieved from the oven. Successive gripping and retrieving movements will bring the pan 26 into a position where it can be suitably lifted from the oven 30 with the pan flanges 32 supported by the full length of the pan engaging members 14 as shown in FIG. 2. The pan 26 can then easily be carried in one hand to the steam table or any other location desired. Thus, an added advantage of the invention is that it would enable two pans to be carried at one time—one in each hand. After the pan 26 is deposited in the steam table well the carrier 10 is easily disengaged from the pan flanges 32 by sliding the carrier 10 backwardly along the pan flanges 32.

An alternate embodiment of the invention, not shown, includes a transverse member 16 that comprises a solid sheet of rigid material, preferably metal, that would extend from near the front edge to near the rear edge of the carrier 10. The transverse member 16 would then also serve as a cover over the pan 26, thereby protecting the handler from the hot contents and preventing foreign objects from falling into the pan while it is being handled.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A carrier for retrieving and lifting pans having peripheral flanges from a rack and transporting them to other locations, said carrier comprising: an elongated rigid handle member; at least one rigid transverse member immovably secured to said hand member; a pair of opposed pan-engaging members immovably secured at the outer edges of said transverse member, each of said pan-engaging members comprising a vertical leg and an inwardly projecting horizontal flange at the bottom edge of said vertical leg, said horizontal flange being adapted to engage with said peripheral flange of said pans on the opposite sides thereof, and a gripping member rigidly secured adjacent to the inside edge of each of said vertical legs of said pan-engaging members, each of said gripping members being adapted to frictionally bear on the upper surface of the flanges of said pans when said flanges of said carrier are in an included position relative to said flanges of said pans, to enable said pans to be progressively retrieved from said rack.

2. The carrier as in claim 1 wherein said transverse member comprises a solid sheet of material extending from near the front to near the rear edge of said carrier.

3. The carrier as in claim 1 wherein said gripping members are substantially circular and have knurled surfaces.